Patented Feb. 2, 1937

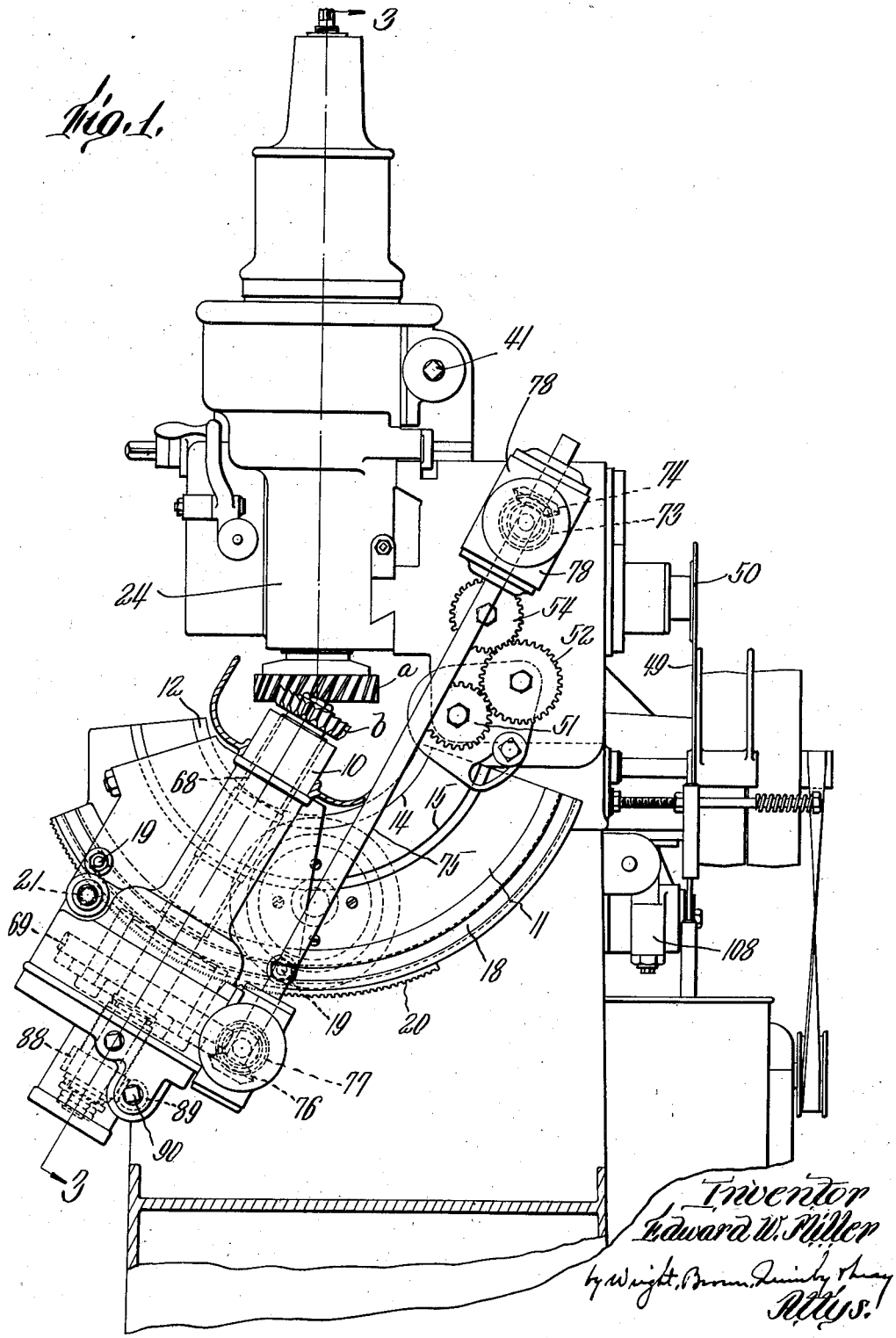

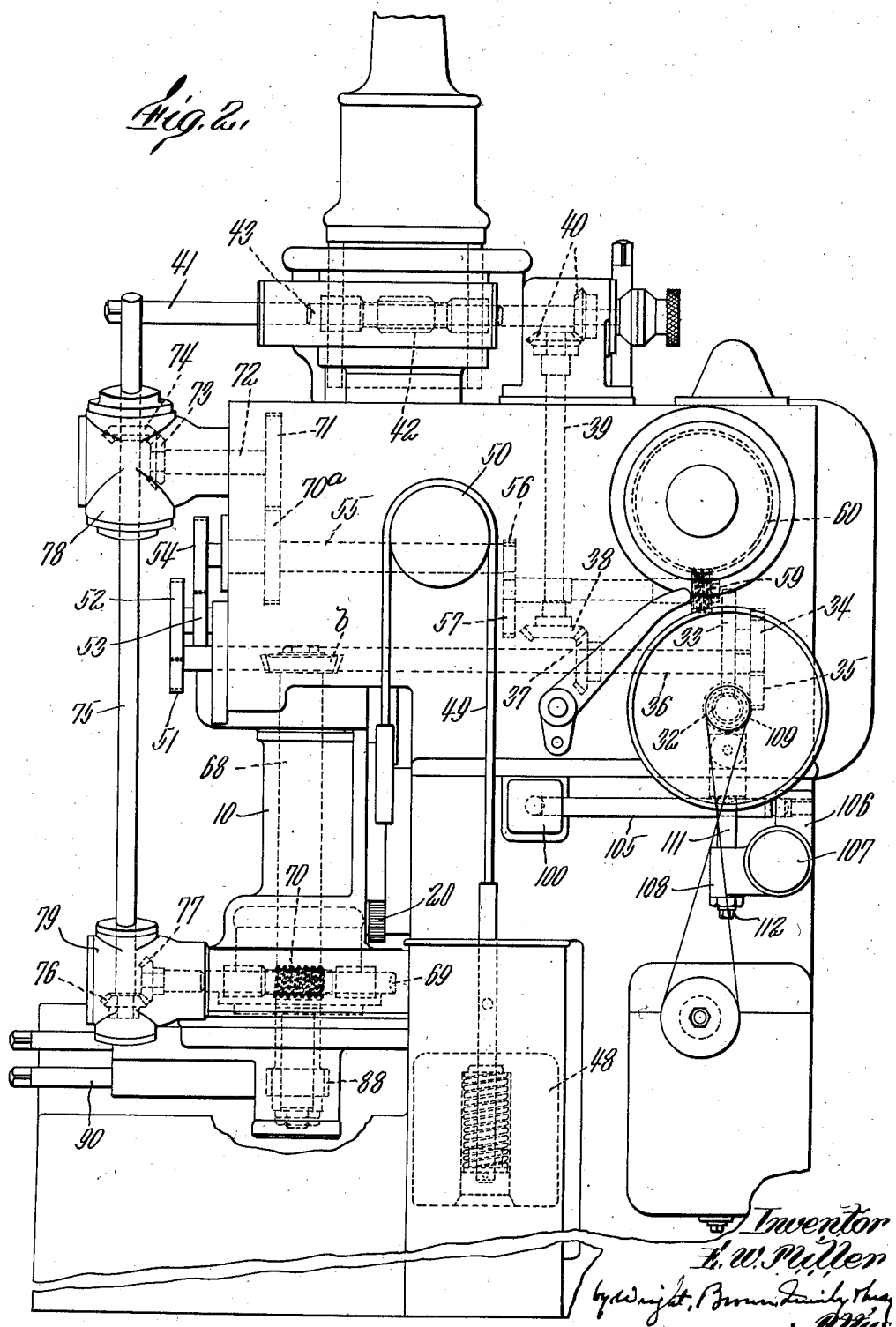

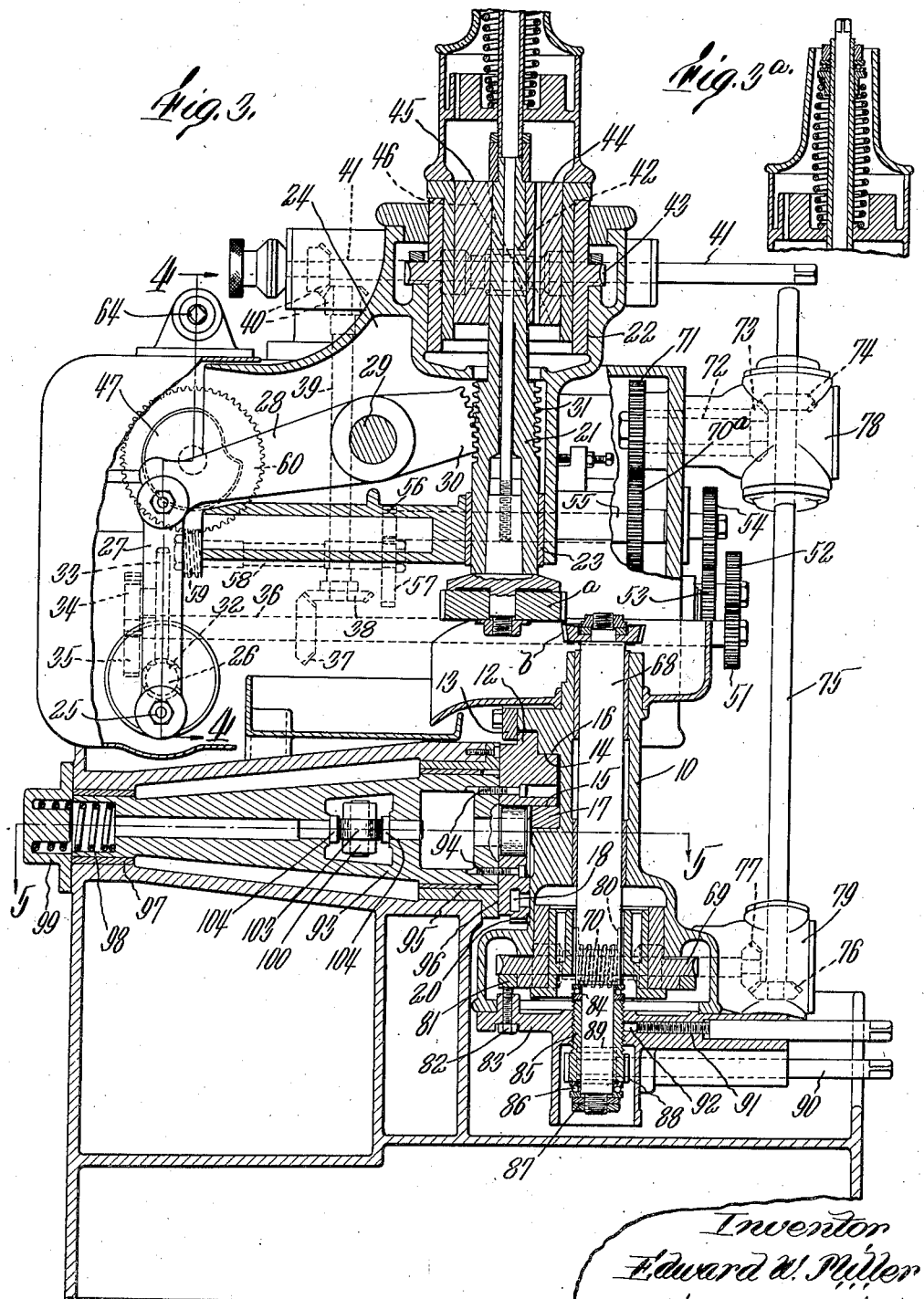

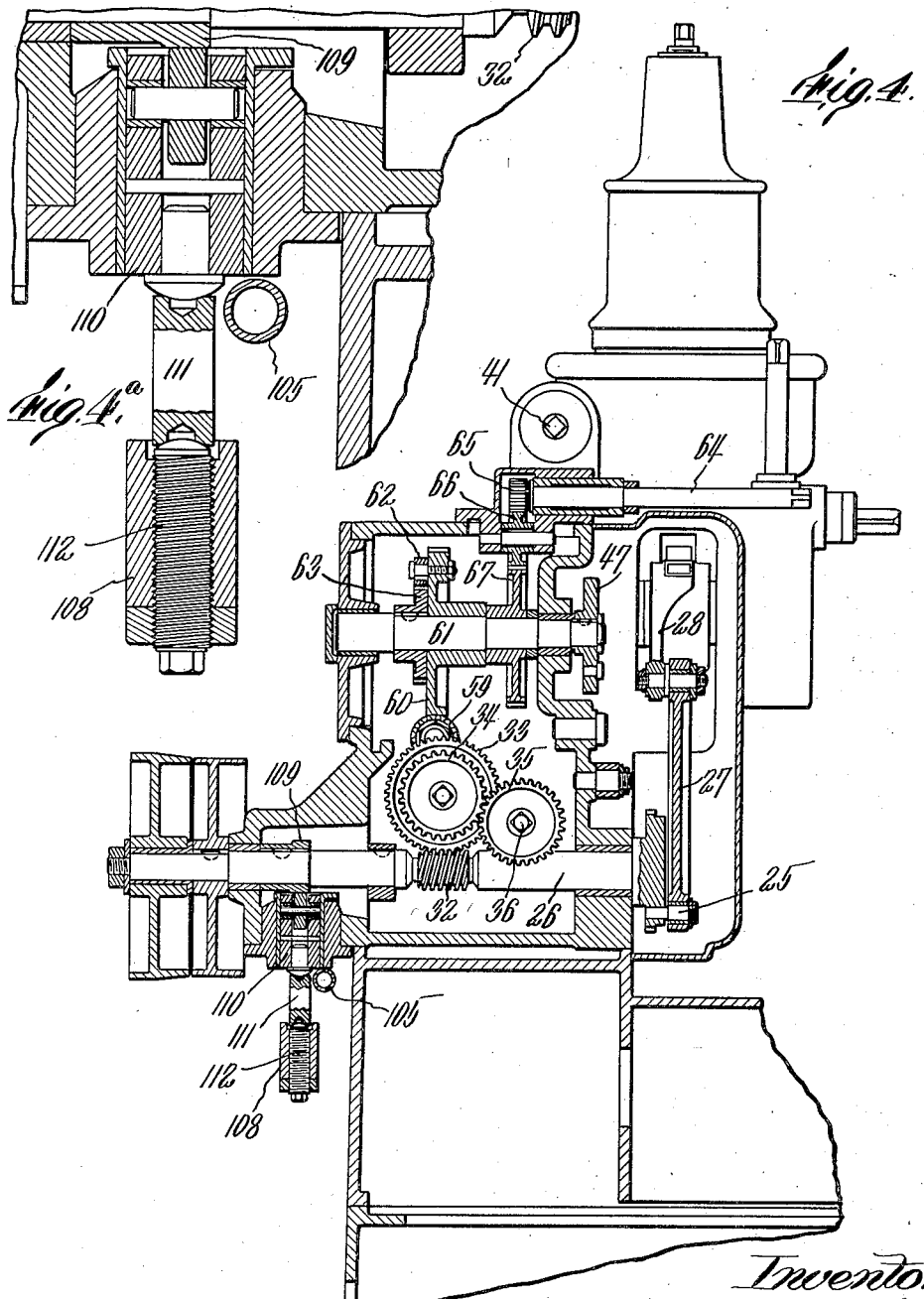

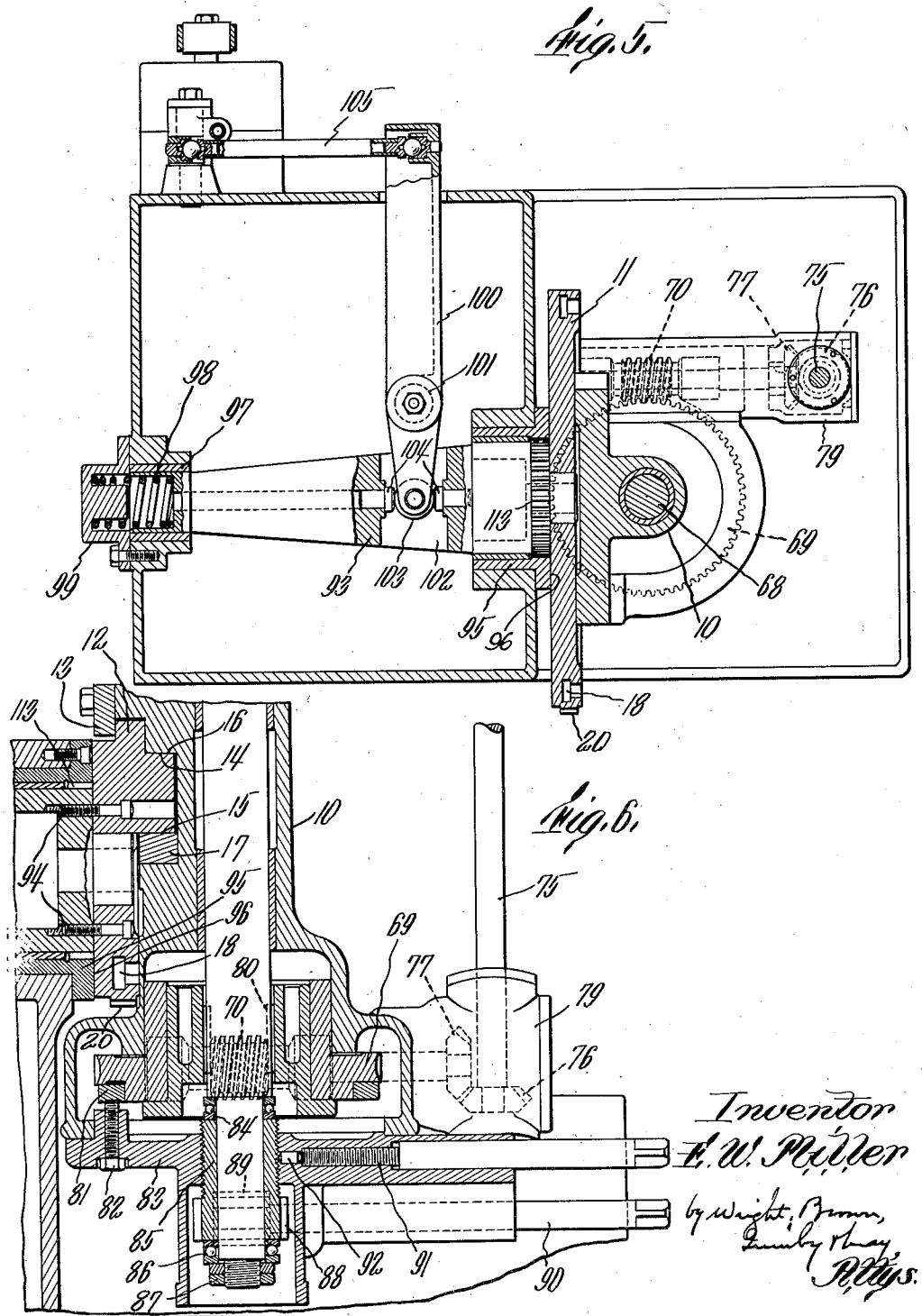

2,069,323

UNITED STATES PATENT OFFICE 2,069,323

HELICAL GEAR SHAPING MACHINE

Edward W. Miller, Springfield, Vt., assignor to The Fellows Gear Shaper Company, Springfield, Vt., a corporation of Vermont Application December 14, 1932, Serial No. 647,175

29 Claims. (Cl. 90—9)

The present invention relates to gear shaping machines of the type in which a tool having cutting edges in the outline of a gear or gear element is employed to generate and cut conjugate gear teeth, by a planing action compounded of relative reciprocation between the cutter and the work in the direction of the axis of one of them, and relative movement in the manner of gears or gear elements running in mesh with one another. Its object is to provide an operative machine having capacity for cutting helical gears with the use of a cutter of which the teeth are arranged similarly to those of a straight or spur gear; for cutting gears of any helix angle from zero to the practicable maximum; and for so cutting gears with the use of either a straight or a helical cutter. A further object is to provide means, related to the foregoing object, by which the relief between the cutter and work piece on non-cutting return strokes is afforded by movement of the cutter bodily away from the work.

In the carrying out of these objects I have provided a machine in which the cutting action is performed by reciprocating the work piece axially while the cutter is held stationary, except for its generative rotation; the cutter is adjustable so that its teeth may be located at any angle to the axis of the work corresponding to the helix of the teeth to be generated in the work piece; and other novel features and improvements over preexisting machines are provided for purposes which will appear in the following description.

The drawings represent one of the possible embodiments of the invention in a machine apt for accomplishing the foregoing and related or auxiliary objects. In these drawings,—

Fig. 1 is a front elevation of the machine;

Fig. 2 is a side elevation as seen from the right of Fig. 1;

Fig. 3 is a sectional view taken on line 3—3 of Fig. 1 looking in the direction of the arrow and shown on a somewhat larger scale;

Fig. 3a is a fragmentary view of the upper extremity of the machine omitted from Fig. 3 on account of limitation of space;

Fig. 4 is a section taken on line 4—4 of Fig. 3 looking in the direction of the arrows;

Fig. 4a is an enlarged fragmentary section of part of the mechanism shown in Fig. 4;

Fig. 5 is a horizontal section taken on line 5—5 of Fig. 3;

Fig. 6 is a fragmentary sectional view showing on a larger scale the parts represented in the lower portion of Fig. 3.

Like reference characters designate the same parts wherever they occur in all the figures.

$a$ represents the completed work piece shown as a helical gear, and $b$ represents the cutter, shown as a standard gear shaper cutter with straight teeth, that is, teeth having no helical inclination or lead. To enable helical teeth of more than a minimum helix angle to be cut by a straight or spur-type cutter, the cutter is mounted with its axis at an angle to the work piece axis equal to the helix angle of the teeth to be cut, and combined motions of axial reciprocation and rotation about its axis are imparted to the work, the resultant of which, with reference to a stationary point, is the same as the helix angle of the gear. The cutter has no axial reciprocative motion in the course of cutting. This, to the best of my knowledge and belief, is a departure from prior practice in the art of gear cutting machines, for which I desire full protection regardless of the specific means for imparting such movements to the work piece. In addition both the work and the cutter are slowly rotated at rates corresponding to those of a helical gear having the same number of teeth as is required to be cut in the work, and a spur gear having the same number of teeth as the cutter, rolling in mesh with one another, whereby the faces of the teeth in the work piece are generated conjugate to the cutter. The cutting action is commenced on the outer circumference of a blank work piece, which is slowly fed in the direction of the common perpendicular to both axes, that is, radially of the cutter until the prescribed depth of cut has been attained, whereupon the action is continued to completion of the gear without change of center distance.

Provision is made for adjustment of the cutter to place its axis, and complementally its plane, at any desired angle to the cutter axis, whereby to produce gears of any helix angle from zero to the practical maximum, and of either right hand or left hand helix, not only by a spur-type cutter but alternatively by a helical cutter as well. For this purpose the cutter is carried by a holder 10 which is mounted on a segmental guide 11. Such guide has an inner guide rib 12 embraced by a gib 13 (Fig. 3) on the holder 10, guide surfaces or shoulders 14 and 15 embraced between shoulders 16 and 17, (the latter being an adjustable take-up piece) on the holder, and an undercut groove 18 in which are contained the heads of clamp bolts 19, 19 mounted in the holder. The boundaries of the parts 12, 14, 15 and 18 are all curved concentrically with a line perpendicular to the axis of the work piece, and the cutter is mounted, and its holder so guided by the means described, that its axis is perpendicular to the same line in all positions of adjustment. The line referred to is in short common perpendicular to the axes of both the work piece and cutter. The cutter is mounted, and is adjustable axially by means later described, so that the plane of its cutting edges is, or may be put, in coincidence with said common perpendicular. Thus the cutter may be adjusted about a diameter in the plane of its cutting edges, whereby its location remains unchanged notwithstanding such adjustment. To facilitate such adjustments the segment 11 is provided on its circumference with a gear segment or curved rack 20, and the cutter holder carries a pinion 21 in mesh with such rack and having a protruding stud shaft adapted to be engaged and rotated by a wrench. Thus the holder may be placed at any angle to the work piece axis, within any prescribed limits, at either side of such axis; including a mid position where it is parallel to such axis and gears of zero helix angle (spur gears) may be cut. It is to be noted that the axes of the cutter and the work piece do not intersect in any adjustment of the cutter spindle. Thus, strictly speaking, from the standpoint of geometrical definition, they do not make a definite angle with one another; and the term "angle" as used in this specification with reference to the relationship between the spindles is to be construed as meaning the angle between either axis and an intersecting line parallel to the other axis, or, in other words, the angle which either axis makes with the plane defined by the other axis and the common perpendicular to the two axes. It follows from this relationship that, when the cutter spindle is adjusted to any position other than parallel to the work spindle, the reciprocating movements of the work spindle carry the gear blank across the plane of the cutting edges of the cutter, in a path which is inclined not only to that plane, but also to the radial plane of the cutter tooth which is nearest to the pitch point between the cutter and work. Defining the terms last used, the "radial plane" of a cutter tooth is the plane midway between the sides of that tooth which includes the axis of the cutter, or, in other words, is perpendicular to the cutting plane of the cutter; and "pitch point" is the point of tangency between the pitch lines or circles of the cutter and work piece.

The details of mechanism for reciprocating and oscillating the work piece and feeding it to depth are of secondary importance to the above described principles of the invention; indeed I have adopted for use in this machine substantially the same mechanical means as are used for actuating the cutters of commercial gear shaping machines and are shown in prior patents, particularly the patent of Edwin R. Fellows, No. 1,478,472, dated December 25, 1923.

The work piece is secured in any suitable way to a spindle 21 which reciprocates and rotates in bearings 22 and 23 in a saddle or carriage 24. Reciprocation is imparted to the spindle by a crank 25 on a main shaft 26 acting through a connecting rod 27, lever arm 28 pivoted on a fixed stud 29, and a gear segment 30 which meshes with the encircling rack teeth 31 on the spindle and is oscillated by said lever arm. Simultaneously the spindle is rotated by a train of gearing consisting of a worm 32 on the main shaft, intermeshing worm wheel 33 and connected gear 34, gear 35, shaft 36, bevel gear pair 37 and 38, upright shaft 39, bevel gear pair 40, upper worm shaft 41, worm 42 thereon, and worm wheel 43 meshing with worm 40, rotatably mounted in the bearing 22 and transmitting rotation to the spindle through guides 44 (secured to the worm wheel) and 45 (secured to the spindle). Such guides have complemental helical contact faces 46, the lead of which is equal to that required for the gear teeth being generated, which impart a component of angular oscillation to the spindle as it reciprocates. They may be disconnected from the worm wheel and spindle respectively, and replaced by others having contact faces of different helical leads, in any desired way, as, for instance, that shown by the patent of E. R. Fellows, No. 1,662,109, March 13, 1928.

The work carriage or saddle is moved radially of the cutter to feed the work to depth, and withdraw finished work pieces, by a cam 47 acting on an abutment of the carriage, not shown, and a weight 48 suspended by a chain 49 surrounding a sprocket 50, such sprocket being coupled with a pinion in mesh with a rack connected to the saddle, and so organized as to tend to withdraw the saddle from the cutter and hold the above mentioned cam abutment against the cam 47. The parts last referred to, which are not shown in these drawings, may be identical or similar to the saddle controlling means shown in Fellows Patent No. 1,463,806, August 7, 1923, or that in my pending application Serial No. 627,730, filed August 6, 1932. As the present invention involves nothing new with respect to the particulars last referred to, I have deemed it unnecessary to complicate the present drawings by repeating an illustration of such details herein.

The train of mechanism for rotating the cam 47 is shown here and consists of shaft 36 previously mentioned, change gears 51, 52, 53 and 54, shaft 55, change gears 56, 57, shaft 58, worm 59 and worm wheel 60. Such worm wheel is loose on the shaft 61 of cam 47 and is coupled to the shaft by a one way clutch consisting of a pawl 62 and ratchet 63, such clutch permitting the carriage to be advanced into initial cutting position manually by a wrench applied to shaft 64; such shaft having a gear 65 which, through an idle gear 66, turns a gear 67 fast on the cam shaft.

Rotation is imparted to the cutter in harmony with the generating rotation of the work by a spindle 68, to which the cutter is secured, rotatably mounted in bearings in the holder 10, and having a splined connection with a worm wheel 69. A worm 70 meshes with such worm wheel and derives motion from the previously named shaft 55 through gears 70a, 71, shaft 72, bevel gears 73, 74, shaft 75 and bevel gears 76, 77, the latter being on the shaft of worm 70. Shaft 75 passes with a splined connection through the gear 74, which latter is rotatably mounted in a housing 78 having a swiveled connection with the frame to turn about the axis of shaft 72. Likewise the housing 79 which contains gears 76 and 77 has a swiveled connection with the cutter holder to turn about the axis of the worm 70. This provides a flexible drive for the cutter spindle which causes the cutter to be rotated in the same manner whatever may be its position of angular adjustment.

The cutter is adjustable in the axial direction through a range which enables the plane of its cutting edges to be placed exactly in coincidence with the common perpendicular to the axis of cutter or work, or to either side of such common perpendicular, for which purpose the spindle 68 is supported independently of the worm wheel 69 and is coupled thereto for torque transmission by longitudinal keys or splines 80. While the worm wheel is supported by a bearing ring 81 resting on the screws 82 threaded through the frame part 83 which provides a cover for the worm wheel housing, the spindle is made with a shoulder resting on a ball thrust bearing 84 which in turn is supported by a threaded sleeve 85 threaded through the cover piece 83 and surrounding an extension of the spindle. A second ball thrust bearing 86 is mounted on the end of such spindle extension between the adjacent end of sleeve 85 and an abutment 87 on the extension. Sleeve 85 is equipped with helical gear teeth 88 meshing with a helical gear 89 on a shaft 90, rotation of which serves to turn the screw sleeve and thereby raise or lower the cutter spindle and cutter. Displacement of the screw sleeve by vibration or other accidental cause is prevented by a clamp screw 91 which crowds a friction piece 92 against the outer side of the sleeve.

Backing off or relief movement to avoid pressure and rubbing of the cutter teeth on the work piece during return travel of the latter after each cutting stroke is effected by moving the cutter bodily away from the work piece in a suitable direction. The cutter supporting segment 11 therefore is secured, not directly to the frame of the machine, but to one end of a slide bar 93, by means of screws 94. Such bar is fitted slidingly in the lining of a sleeve or guideway 95 which is secured rigidly in a recess in the frame, and the outer flanged end of which furnishes an abutment surface 96 against which the back of the segment 11 is drawn and held while the cutting strokes are performed. So far as concerns the backing off movements of the cutter, the segment 11 is in effect a part of the cutter holder.

The end of slide bar 93 remote from the cutter holder is fitted to slide in a fixed guideway 97 of the frame and is pressed upon by a spring 98, reacting against abutment 99 secured on the outside of the frame across such guideway, in a direction tending to displace the cutter from working position.

A lever 100 is mounted on a stationary fulcrum pivot 101 with one of its arms extending into an opening 102 of the slide bar and carrying a roll 103 in engagement with flanking wear pieces 104 mounted in the bar at each side of this opening.

The other arm of the lever projects from the side of the machine base and is engaged with one end of a thrust rod 105, the other end of which engages the arm 106 of a bell crank lever pivoted on a stud 107. Said bell crank lever has a second arm 108 which is acted on by a cam 109 on the main shaft through the medium of a slide 110 and a thrust rod 111. Spring 98 takes up all backlash and looseness in the articulated linkage between the lever and cam just described, whereby the slide is caused to follow the rises and descents of the cam instantly and accurately. It will be noted that the positive effect of the cam is to force the work holder against the abutment 96, while the movement of the cutter holder effected by the spring is only that of withdrawal from the cutting position. Provision is made by a screw 112 in the bell crank arm 108 for taking up wear between the parts of the linkage and effecting a desired degree of pressure of the work holder against the abutment.

The cam 109 is timed with the crank 25 to cause backing off of the cutter at the end of each cutting stroke and its return before the beginning of the next cutting stroke, while holding the cutter clear of the work throughout the whole of each return stroke. It hardly needs saying that the displacement of the cutter in either direction is made while the work piece is clear of the cutter. These movements of displacement may be very slight, i. e., in the order of a few thousandths of an inch, with attainment of complete freedom from rubbing on return strokes. In the interest of economically accurate manufacture, the guided parts of the slide bar 93 and the bearings or guideways in which they fit, are preferably made cylindrical and coaxial. In order to prevent turning of the cutter holder about the axis of such bearing surfaces the slide bar is provided with guide ribs 113 which may be in the form of external gear teeth, and the guide sleeve 95 is provided with complemental internal ribs or teeth in the same zone.

It will be appreciated at once that in case a helical cutter instead of a straight cutter is used, the angle between the cutter axis and the work axis is made equal, not to the helix angle of the teeth to be cut in the work, but to the difference between this helix angle and that of the cutter teeth. However, I wish to make it clear that, although a helical cutter may be used, such is not the best practice, and one of the principal advantages of the machine is that it enables cutters of the spur or straight gear type to be used in cutting all helical gears. Straight toothed cutters may be made within prescribed limits of tolerance and reproduced to the same accuracy, without the troublesome problems which arise in the making of helical cutters; and the same spur cutter will generate helical gear teeth of equal truth and accuracy whatever may be the helix angle of the latter. That is, all helical gears made by the same spur cutter are conjugate with equal accuracy to all spur gears of the same pitch, pressure angle and width of tooth as the cutter.

A radical departure is embodied in this machine from the prior gear shaper machines of the Fellows type, by virtue of the disposition of the cutter and work piece with reference to the operating mechanisms and adjusting means, herein shown. It results in the ability to avoid the complications of the helical gear shaper cutter, without requiring the work to make a multiplicity of rotations before its completion, in completely avoiding feed lines which are apparent in the cutting of a gear with multiple rotations and an incremental feed, and it enables the same cutter to be used in generating gears with a multiplicity of different helix angles. While, as previously stated, a helical cutter can be used in this machine, yet the difficulties and complications of producing helical cutters which will produce accurate results and will cut satisfactorily, are so great as to make the ability to use a spur type cutter a very great advantage. I am aware that machines have been designed for using a reciprocating spur type cutter for this purpose, but such machines involve an angular adjustment of the work with respect to the cutter, and necessitate a multiplicity of rotations of the work and cutter with incremental feed of the work. The multiplicity of rotations is necessary to prevent hollow-cutting of the work because the traverse of the cutter in a path oblique to the work brings its cutting edges to progressively shorter or longer distances from the axis of the work in approaching or receding from the common perpendicular to the axes of cutter and work. The process thus carried out is relatively slow, and in addition the incremental feed causes feed marks to show in the work, particularly when cutting sharp helix angles. The absence of incremental feed movement in the machine of this invention, made possible by the fact that the cutter is stationary (except for its generative rotation), enables the work to be finished in one rotation, after completion of the preliminary depth feed, with each cut a single continuous sweep from end to end of the gear, which completely avoids formation of the feed marks or lines referred to.

All persons skilled in the art will recognize that the general principles of the invention are not dependent on the details of driving mechanism or supporting structure; and that I may modify the machine widely in those respects without departing from the claimed subject matter. The same principles may be applied for cutting internal gears as well as external gears; and the limiting gear element known as a rack is included within the scope of the term "gear element" as used in this specification, whether applied to the cutter or to the work piece.

What I claim and desire to secure by Letters Patent is:

1. A helical gear generating machine comprising a lengthwise reciprocative and rotatable spindle adapted to carry a work piece, a gear shaper cutter having teeth arranged similarly to those of a spur gear, and means for holding said cutter with its axis inclined to the axis of said spindle but in a different plane therefrom, combined with means for giving simultaneous generative rotation to the cutter and work spindle while holding the cutter against axial displacement.

2. A gear shaping machine comprising a reciprocatively and rotatably mounted work spindle, means for securing a gear blank thereto, means for reciprocating said spindle, means for giving a back and forth oscillation about its axis thereto simultaneously with the reciprocations in opposite directions, whereby points in the work piece at a given distance from the axis are transported in a given helical path, a gear shaper cutter, and means for holding said cutter relatively stationary in a position to cut the work piece when the latter advances in one direction, and with those teeth which are momentarily in cutting position inclined to the axis of the work spindle in substantially the same degree as the helical paths in which those points of the work piece travel which are passing in cutting engagement with such cutter teeth.

3. A helical gear shaping machine comprising an axially reciprocatable and rotatable work spindle, means for reciprocating and rotating said spindle, changeable means for oscillating said spindle oppositely in the course of opposite reciprocations, a cutter spindle, a gear shaper cutter mounted on the last named spindle, means for rotating said cutter spindle in harmony with the first named rotation of the work spindle, and supporting means for the cutter spindle arranged to hold the same in fixed location with its axis inclined to that of the work spindle axis and in a different plane therefrom.

4. A helical gear shaping machine comprising a reciprocatable and oscillative work spindle, means for so moving the spindle that points in the tooth bearing zone of a gear blank carried thereby travel in helical paths, and a gear shaper cutter mounted in a fixed location with its teeth intersecting the space in which such tooth bearing zone travels and inclined conformably to the helix angle of the teeth to be cut.

5. A gear shaping machine as set forth in claim 4 and comprising further means for imparting to the work spindle and the cutter generating rotation at relative speeds and directions similar to those of conjugate gears corresponding in diameter and pitch to the cutter and work piece, respectively, running in mesh.

6. In a gear shaping machine, a cutter having teeth with cutting edges at one end arranged in the manner of the teeth of a gear element, a holder for said cutter adjustable angularly about an axis intersecting the cutter axis substantially in the plane in which said cutting edges lie, a work holder mounted with its own axis intersecting and perpendicular to said axis of adjustment, means for reciprocating said work holder in the direction of, and means for simultaneously oscillating the work holder about its own axis.

7. A gear generating machine comprising a work spindle and a cutter spindle located on nonintersecting axes, means for supporting one of said spindles with capability for angular adjustment about the common perpendicular to said axes, means for reciprocating one of the spindles in the direction of its own axis, means for giving a simultaneous generating rotation to both spindles, and means for giving back and forth angular movements to the work spindle simultaneously with the opposite reciprocations of said reciprocatable spindle.

8. In a gear generating machine, a cutter spindle, a holder in which said spindle is rotatably mounted, a segmental guide having curved guiding elements concentric with a line perpendicular to the axis of said spindle on which said holder is mounted with provision for adjustment angularly about such line, a worm wheel concentric with said spindle in rotation transmitting connection therewith and a worm meshing with said worm wheel carried by said holder, a main power shaft, and articulated connection between said main shaft and worm adapted to transmit rotation to the latter in all positions of angular adjustment of the spindle holder.

9. In a gear generating machine, a cutter spindle, a holder in which said spindle is rotatably mounted, a segmental guide having curved guiding elements concentric with a line perpendicular to the axis of said spindle and approximately in the working location of the cutter, on which guide said holder is mounted with provision for adjustment angularly about such line, a spindle rotating gear mounted in said holder concentric with the spindle and in splined engagement therewith, driving means for said gear, means for adjusting the spindle lengthwise independently of said gear, and a work spindle mounted to reciprocate in a path intersecting the before named line.

10. In a gear generating machine, the combination with cutter and work holders, one of which is reciprocative relative to the other for shaping gears, of adjustable supporting means for the non-reciprocative holder organized to permit adjustment of the latter angularly about a line perpendicular to the direction of movement of the reciprocative holder, and means for giving said non-reciprocative holder relief and return movements in time with, and in directions transverse to, the reciprocations of the other holder.

11. A machine for generating helical gears by the planing action of a gear shaper cutter having teeth arranged similarly to those of a spur gear, comprising means for supporting such a cutter in a stationary location, a work spindle rotatably and reciprocatively mounted at one side of the cutter with its axis making an oblique angle to the plane in which the cutting edges of the cutter lie, said spindle having provisions for carrying a gear blank in pitch circle tangency with the cutter, and means for giving to the spindle a compound motion of endwise reciprocation and angular oscillation about its axis in such manner as to move such gear blank back and forth in a helical path, the helix angle of which at the side of the gear blank next to the cutter is substantially tangent to the axial projection of the nearest tooth of the cutter.

12. A machine for generating helical gears by the planing action of a gear shaper cutter having teeth arranged similarly to those of a spur gear, comprising means for supporting such a cutter in a stationary location, a work spindle rotatably and reciprocatively mounted at one side of the cutter with its axis making an oblique angle to the plane in which the cutting edges of the cutter lie, said spindle having provisions for carrying a gear blank in pitch circle tangency with the cutter, means for giving to the spindle a compound motion of endwise reciprocation and angular oscillation about its axis in such manner as to move such gear blank back and forth in a helical path, the helix angle of which at the side of the gear blank next to the cutter is substantially tangent to the axial projection of the nearest tooth of the cutter, and means for giving generative rotation to the cutter and work spindle at relative velocities equal to those of a helical gear and spur pinion having the same number of teeth as the work piece and cutter respectively, running in mesh together.

13. A machine for generating helical gears comprising a gear shaper cutter having teeth arranged similarly to those of a spur gear, a reciprocatively and rotatably mounted work spindle, means for supporting said cutter at one side of the work spindle with provisions for adjustment angularly about the common perpendicular to the axes of the cutter and work spindle, the cutter being located with a diameter in the plane of its cutting edges substantially coincident with such common perpendicular, and means for imparting to the work spindle a compound movement of axial reciprocation and angular rotation.

14. A machine for generating helical gears comprising a gear shaper cutter having teeth arranged similarly to those of a spur gear, a reciprocatively and rotatably mounted work spindle, means for supporting said cutter at one side of the work spindle with provisions for adjustment angularly about the common perpendicular to the axes of the cutter and work spindle, the cutter being located with a diameter in the plane of its cutting edges substantially coincident with such common perpendicular, means for imparting to the work spindle a compound movement of axial reciprocation and angular rotation, and means for simultaneously rotating said work spindle and cutter at predetermined speed ratios.

15. A gear generating machine comprising a cutter having teeth arranged similarly to the teeth of a gear element and provided with cutting edges at their ends, means for holding said cutter with capacity for movement linearly of the pitch line of its teeth and preventing its movement otherwise, means for reciprocating a gear blank bodily across the plane of such cutting edges in tooth-cutting relationship thereto, in a path inclined both to said plane and to the radial mid plane of the cutter tooth which is nearest to the pitch point between cutter and work, and means for simultaneously oscillating the gear blank so that points in its side next to said cutter teeth travel lengthwise of said radial mid plane.

16. A helical gear shaper comprising means for reciprocating axially and at the same time oscillating about its own axis a gear blank, a cutter having teeth similar in outline and arrangement to the teeth of a gear element with cutting edges at their ends, and means for supporting said cutter rotatably about its axis and immovably in the direction of its axis, in position to intersect the circumference of the gear blank between the limits of reciprocation of the latter, and with the plane of its cutting edges substantially perpendicular to the resultant of the rectilinear and rotary movements of the work piece.

17. A helical gear generating machine comprising a lengthwise reciprocative and rotatable spindle adapted to carry a work piece, a gear shaper cutter having teeth arranged similarly to those of a spur gear and provided with cutting edges at their ends, and means for holding said cutter against endwise movement, while permitting its rotation, and with its axis inclined to a line parallel to the axis of said spindle.

18. In a gear generating machine, the combination with a reciprocative and rotative work spindle, of a gear shaper cutter, adjustable holding means for said cutter operable to incline the same angularly about an axis perpendicular to the work spindle and in the cutting plane of the cutter, and means for securing said cutter adjustably in different positions along its own axis and for preventing its reciprocation.

19. In a gear shaping machine, the combination with a reciprocative work spindle and means for reciprocating said spindle, of a slide movable perpendicularly to the directions of reciprocation of said spindle, a segmental guide carried by said slide having curved guiding portions concentric with a line extending in the same direction as the path of said slide, a cutter holder mounted on said guide with provision for adjustment thereon angularly about the center of said curved guiding portion, and a cutter supported by said holder substantially at said center.

20. A gear shaping machine comprising a reciprocatable and rotatable work spindle, mechanism for reciprocating said spindle, a gear shaper cutter, holding means for said cutter including a slide bar movable in a line substantially parallel with the common perpendicular to the axes of the work spindle and cutter, and means for moving said slide bar back and forth in time with the opposite strokes of the work spindle.

21. In a gear shaping machine having a work spindle and a cutter spindle, means for moving one of said spindles bodily toward and away from the other comprising a bar supported in guideways in the machine structure with provisions for linear movement in the same general direction as the common perpendicular to the two spindles, means for reciprocating one of said spindles axially, and correlated mechanism for imparting back and forth movements to the slide bar in time with the opposite strokes of the spindle which is so reciprocated.

22. In a gear shaping machine, a reciprocative and rotatable spindle, a slide bar supported with provision for movement in a line transverse to said spindle, mechanism for reciprocating said spindle, correlated means for moving said slide bar in opposite directions respectively at the ends of the opposite strokes of said spindle, a guide carried by said slide bar and curved concentrically with a line perpendicular to the axis of the reciprocatable spindle and parallel to the line of movement of the slide bar, a second spindle, and a holder for said second spindle adjustably secured to said curved guideway and arranged to hold the second spindle with its axis radial to said common perpendicular.

23. In a gear shaping machine, a main drive shaft, a spindle mounted with provision for endwise reciprocative movement, means driven by said shaft for so reciprocating said spindle, a slide mounted in the machine with provision for reciprocative movement in a line transverse to said spindle, a cam on the main shaft, and mechanism for imparting movement from the cam in one direction to the slide, yieldable force-applying means acting on the slide in opposition to the force application of the cam, and a second spindle carried by said slide and movable thereby toward and away from the first spindle.

24. The method of generating helical gears which consists in reciprocating a gear blank across the plane of the cutting edges of a gear-like planing cutter in a path which causes the portion of the blank in which teeth are to be cut to overlap the tooth bearing zone of the cutter, at the same time giving a component of rotary motion to the blank about its axis such that points on such portion travel in helical paths, and holding the cutter against bodily displacement in a position such that its teeth nearest to the blank extend substantially tangent to the helical paths of those parts of the blank which are in cutting relationship to such teeth.

25. The method of generating helical gears which consists in reciprocating a gear blank axially and at the same time partially rotating the blank back and forth about its axis so that points on the portion of the blank wherein teeth are to be cut travel in helical paths, and in mounting a gear shaper cutter with its axis at one side of the axis of the blank and in such position that its tooth bearing portion overlaps the said portion of the blank on one side and its teeth at the overlapping side extend conformably to the helical paths traversed by the respectively adjacent points of the blank.

26. The method of generating helical gears which consists in mounting a gear shaper cutter in a fixed location, and in reciprocating a gear blank in a path which causes the portion thereof in which teeth are to be cut to overlap the teeth of the cutter at one side, such path being also inclined to the plane in which the cutting ends of the cutter teeth lie, turning the blank back and forth about its axis in time with its reciprocating movements so as to cause points on the said portion thereof to travel in helical paths, and effecting a rolling generative motion between the cutter and blank.

27. The method of generating helical gears by means of a gear shaper cutter having straight spur teeth which consists in reciprocating and simultaneously turning a gear blank so that points on the portion thereof in which teeth are to be cut travel in helical paths of a given helix angle with respect to the axis of the blank, and holding a gear shaper cutter of spur gear character in a fixed location such that its teeth are inclined to the direction of reciprocating movement of the blank in conformity with the helix angle of the teeth to be cut, bringing the toothed portion of the cutter and the portion to be toothed of the blank into overlapping relationship, and imparting progressive generating movements to both cutter and blank.

28. In a gear shaping machine, a cutter spindle having provision for mounting a gear shaper cutter in a definite location on the spindle, means for supporting the spindle comprising complemental guiding members of arcuate curvature, one of which members is fixed on the machine structure and the other is adjustable in a path defined by such arcuate curvature, and a holder for the spindle in rigid connection with said adjustable member constructed to hold the spindle with its axis intersecting the axis of said arcuate curvature and the cutter location thereon in substantial coincidence with such axis of curvature, said guiding member being formed to leave a clear space for coaction between such cutter and a work piece at that location.

29. In a gear shaping machine, a cutter spindle having provision for mounting a gear shaper cutter in a definite location on the spindle, means for supporting the spindle comprising complemental guiding members of arcuate curvature, one of which members is fixed on the machine structure and the other is adjustable in a path defined by such arcuate curvature, a holder for the spindle in rigid connection with said adjustable member constructed to hold the spindle with its axis intersecting the axis of said arcuate curvature and the cutter location thereon in substantial coincidence with such axis of curvature, said guiding member being formed to leave a clear space for coaction between such cutter and a work piece at that location, and articulated rotation-transmitting mechanism organized to rotate said spindle in all of its positions of angular adjustment.

EDWARD W. MILLER.